(12) United States Patent
O'Hara

(10) Patent No.: US 11,539,744 B2
(45) Date of Patent: Dec. 27, 2022

(54) DETECTION AND MITIGATION OF CRYPTOJACKING

(71) Applicant: Arbor Networks, Inc., Westford, MA (US)

(72) Inventor: Sean O'Hara, Ypsilanti, MI (US)

(73) Assignee: Arbor Networks, Inc., Westford, MA (US)

(*) Notice: Subject to any disclaimer, the term of this patent is extended or adjusted under 35 U.S.C. 154(b) by 256 days.

(21) Appl. No.: 16/990,199

(22) Filed: Aug. 11, 2020

(65) Prior Publication Data
US 2022/0053006 A1   Feb. 17, 2022

(51) Int. Cl.
*H04L 9/40* (2022.01)

(52) U.S. Cl.
CPC ........ *H04L 63/1466* (2013.01); *H04L 63/101* (2013.01); *H04L 63/1416* (2013.01); *H04L 63/1441* (2013.01); *H04L 2463/102* (2013.01)

(58) Field of Classification Search
CPC ............. H04L 63/1466; H04L 63/1441; H04L 63/1416
See application file for complete search history.

(56) References Cited

U.S. PATENT DOCUMENTS 11,184,373 B2 * 11/2021 Lancioni ............. G06F 11/3006
11,258,825 B1 *  2/2022 Yang ....................... H04L 63/20

OTHER PUBLICATIONS

Korolov, Maria. "Howto detect and prevent crypto mining malware", CSO. Apr. 4, 2018. retrieved from https://www.csoonline.com/article/3267572/how-to-detect-and-prevent-crypto-mining-malware.html on Jun. 18, 2022 (Year: 2018).*
Russo et al. "Detection of illicit cryptomining using network metadata", EURASIP Journal on Information Security 2021, 11 (2021). Dec. 4, 2021 (Year: 2021).*
Naseem et al. "MINOS*: A Lightweight Real-Time Cryptojacking Detection System", Network and Distributed Systems Security (NDSS) Symposium 2021. Feb. 21, 2021 (Year: 2021).*
Munoz et al. "Detecting cryptocurrency miners with NetFlow/IPFIX network measurements", 2019 IEEE International Symposium on Measurements & Networking (M&N), 2019 (Year: 2019).*

* cited by examiner

*Primary Examiner* — Zachary A. Davis
(74) *Attorney, Agent, or Firm* — Locke Lord LLP; Scott D. Wofsy; Christopher J. Capelli

(57) ABSTRACT

A method of monitoring network traffic for cryptojacking activity is provided. A request is received from a protected host. It is determined whether the request is a cryptocurrency request based on whether the request uses a protocol specified for requests belonging to the cryptocurrency communication. In response to a determination that the request is a cryptocurrency request for the cryptocurrency, a second request is submitted to a destination indicated by the request, wherein the second request is formatted as a cryptocurrency request for the cryptocurrency. A determination is made whether a reply to the second request from the destination is a cryptocurrency response for the cryptocurrency based on whether the response uses a protocol specified for a response that belongs to communication associated with the cryptocurrency. An intervention action is caused in response to a determination that the reply to the second request from the destination is a cryptocurrency response for the cryptocurrency.

18 Claims, 3 Drawing Sheets

DETECTION AND MITIGATION OF CRYPTOJACKING

BACKGROUND

1. Field of the Disclosure

The present disclosure relates to network monitoring, and more particularly, to detection and mitigation of cryptojacking.

2. Description of Related Art

Cryptojacking is the unauthorized use of computing resources to mine cryptocurrencies. An attacker can apply cryptojacking malware to hijack computing resources. The attacker may hijack only a portion of resources of selected machines of a computer network for mining cryptocurrencies. While the mined cryptocurrencies generate money for the attackers, they may be unnoticed by the computer network for a long time. This type of attack does not cause damage to a system other than to consume resources, causing the computers having hijacked resources to run more slowly and consume more energy. Further, cryptojacking attacks can be a form of organized crime. The attacked network may not want to be associated with sponsoring organized crime.

One example solution that has been used is to apply known pools of cryptocurrency, such as Monero, to domain name system (DNS) response policy zone (RPZ) firewall rules. This solution is ineffective when an attacker uses a proxy that is not included in the known pools.

Attackers are able to customize proxies and use proxies that are not yet included in the known pools, in so doing evading detection. The attack can be orchestrated by a third party by commandeering a computer (e.g., an email server, workstation, etc.) from any remote location. The commandeered computer can belong to a protected network. The remote location from which the attack is perpetrated can be geographically distant from the computer that has been commandeered. In another scenario, an authorized user of a host on the protected network can use the resources of the protected network for resource intense cryptographic mining activities.

While conventional methods and systems have generally been considered satisfactory for their intended purpose, there is still a need in the art for network monitoring systems to effectively detect and mitigate cryptojacking attacks.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of monitoring network traffic for cryptojacking activity. The method includes receiving a first request from a protected host of a protected network. A determination is made whether the first request is a cryptocurrency request for a cryptocurrency of at least one cryptocurrency based on whether the request uses a protocol specified for requests that belong to communication associated with the cryptocurrency. In response to a determination that the first request is a cryptocurrency request for the cryptocurrency, a second request is submitted to a destination indicated by the first request, wherein the second request is formatted as a cryptocurrency request for the cryptocurrency. A determination is made whether a reply to the second request from the destination is a cryptocurrency response for the cryptocurrency based on whether the response uses a protocol specified for responses that belong to communication associated with the cryptocurrency. An intervention action is caused in response to a determination that the reply to the second request from the destination is a cryptocurrency response for the cryptocurrency.

In one or more embodiments, the method further includes, in response to a determination that the first request is not a cryptocurrency request for the cryptocurrency, forwarding the first request for normal processing.

In one or more embodiments, the method further includes, in response to a determination that the reply is not a cryptocurrency reply for the cryptocurrency, forwarding the first request for normal processing.

In one or more embodiments, the intervention action includes at least one of adding the destination to a blacklist and dropping the first request.

In one or more embodiments, the method further includes determining whether the destination is blacklisted and causing the intervention action in response to a determination that the destination is blacklisted.

In one or more embodiments, the intervention action includes dropping the first request.

In accordance with further aspects of the disclosure, a computer system is provided that performs the disclosed method. In accordance with still further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
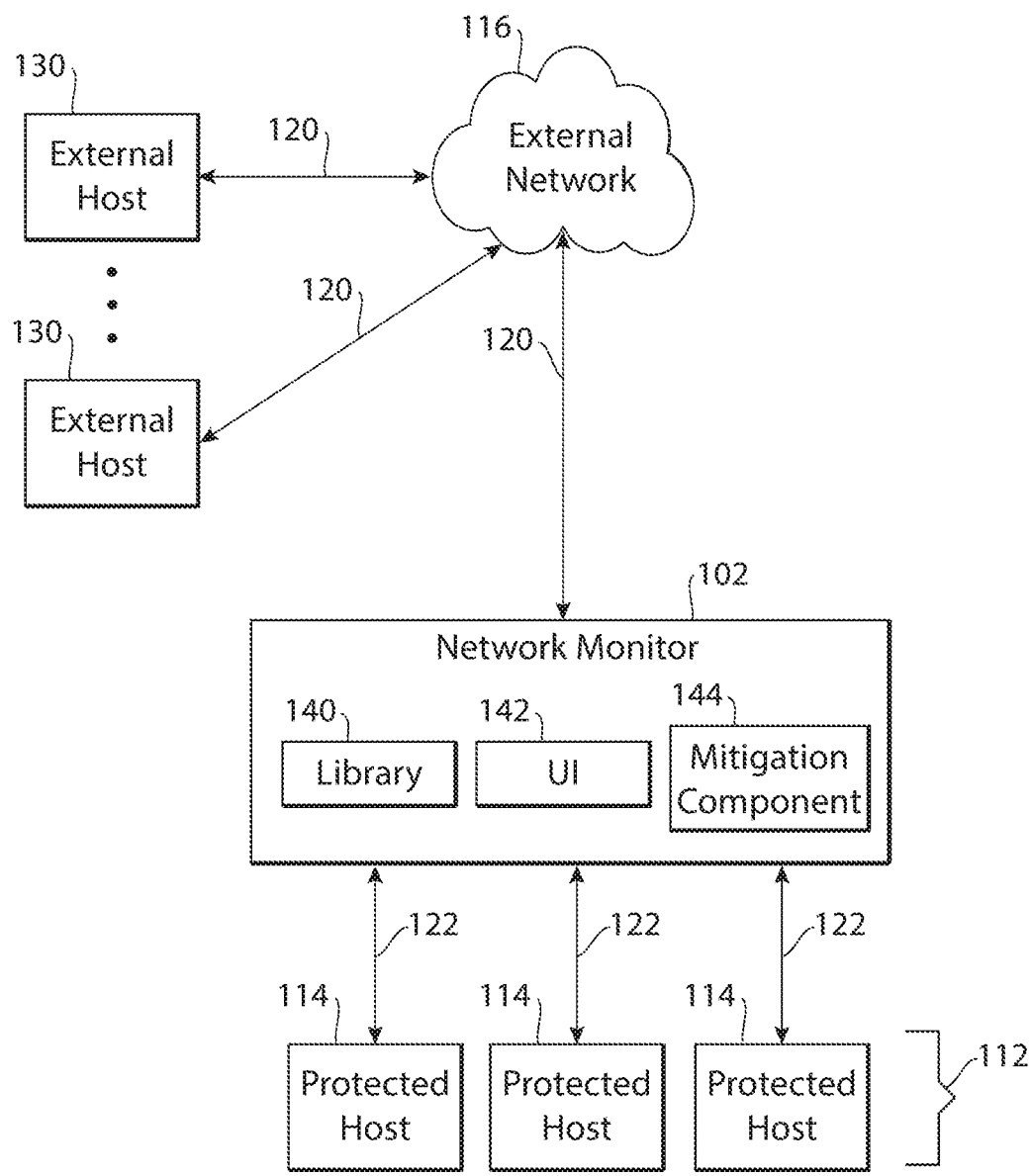
FIG. 1 illustrates a block diagram of an example network system having a network monitor providing protection to a protected network that communicates with one or more external networks in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with monitoring operations associated with a protected network of the network system 100 in accordance with the disclosure, or aspects thereof, are provided in FIGS. 2 and 3, as will be described. The systems and methods described herein can be used to monitor network traffic for cryptojacking activity and cause an intervention action to be implemented in response to a determination that network traffic is being used for cryptojacking.

With reference now to FIG. 1, network system 100 includes a network monitor 102 and one or more protected networks 112, each protected network having one or more protected hosts 114. External hosts 130 can communicate with protected hosts 114 via an external network 116. Any of external hosts 130 can be a malicious computing device that uses the external network 116.

Network monitor 102 monitors network traffic to and from protected hosts 114 of the one or more protected networks 112 and analyzes request traffic output by the protected hosts. When analyzing a request, network monitor 102 determines whether the request is a cryptocurrency request by determining whether the request uses a protocol specified for requests that belongs to communication associated with the cryptocurrency. Communication associated with the cryptocurrency refers to communication associated with activity for the cryptocurrency, such as mining activity. The network monitor 102 can compare the request to protocols used by requests of one or more different cryptocurrencies that are implemented with JSON-RPC, which is a remote procedure call (RPC) protocol encoded in JSON, for example cryptocurrencies such as Monero® Bitcoin® Ethereum® Litecoin® etc. If the request does not match a protocol used by requests of the cryptocurrencies, the request can be forwarded for normal processing, e.g., to its intended destination. However, if the request is determined to match a protocol used by one of the cryptocurrencies, the network monitor 102 submits a second request to a destination specified by the request. The second request is formatted as a cryptocurrency request for the cryptocurrency.

The network monitor 102 determines whether a response to the second request that is received from the destination is a cryptocurrency response for the cryptocurrency. This determination can include comparing the response to protocols specified to be used for responses of the cryptocurrency. If it is determined that the response is a cryptocurrency response for the cryptocurrency, an intervention action is applied. Intervention actions can be, for example, adding the destination to a blacklist and/or dropping the request. The blacklist can be an L3 blacklist that includes L3 information.

The network monitor 102 includes or accesses a library 140, a user interface (UI) 142, and a mitigation component 144. Library 140 can include a library of protocols used by requests or responses for one or more cryptocurrencies. The UI 142 interfaces with a user for receiving user updates, such as for manual updates to library 140. In an example, the UI can provide a graphical user interface (GUI) that can output a menu, or the equivalent, for display on a display device and receive menu selections or user entries as user input. The mitigation component 144 can operate on the request to drop the request and/or the mitigation component 144 can add a destination indicated in the request to the L3 blacklist.

Network traffic can flow via communications links 120 and 122. The network traffic flowing via communication links 120 and 122 can include layer three (L3) and layer seven (L7) traffic. The Open Systems Interconnection (OSI) model defines L3 as a network layer and L7 as an application layer. The network traffic flows to and from external network 116 via wired and/or wireless communication links 120. Network traffic flows between the network monitor 102 and the protected hosts 114 of the protected network(s) 112 via wired and/or wireless communication links 122.

Network monitor 102 includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also store analyzing criteria for examining the request, first request, and the response, such as the whitelist and/or blacklist. The whitelisting and backlisting can be performed at the third layer. Network monitor 102 can be implemented as physical or virtual devices. Whether implemented as physical or virtual device(s), network monitor 102 uses a local or remote hardware processing device that executes software instructions, which enables performance of the disclosed functions.

Library 140 can be stored in a storage device that includes computer system readable media in the form of volatile or non/volatile memory or storage media, such as random access memory (RAM), cache memory, a magnetic disk, an optical disk, etc. The storage device can be accessible by network monitor 102, and can be integrated with or external from network monitor 102.

Mitigation component 144 can be accessible by network monitor 102, and can be integrated with or external to network monitor 102. Mitigation component 144 can be implemented using hardware, software, firmware, or a combination thereof. In embodiments, mitigation component 144 can include one or more mitigation devices, each implemented using different physical devices. In embodiments, one or more of the mitigation devices can share one or more software, hardware, or firmware components.

In embodiments, at least portions of the network monitor 102 are located between the external network 116 and the protected network 112. In other embodiments, at least portions of the network monitor 102 are located within the external network 116 or protected network 112. At least portions of the network monitor 102 can be located at a network edge (inside or outside of the protected network 114) or deeper within the protected network 112.

The network monitor 102 includes or communicates with hardware, firmware, and/or software components that are configured to observe content of packets included in network traffic. Network monitor 102 can include central or distributed elements for intercepting and/or analyzing network data. These elements can be passive or active and include software, firmware, and/or hardware components, such as taps, probes, or port mirrors. These elements can be positioned inline, and/or remote relative to communication links 120 and 122.

In the example shown, one protected network 112 is shown, however one skilled in the art will recognize that the network monitor 102 can provide a protection service to multiple protected networks 112. Similarly, the number of protected hosts 114 per protected network is not limited to a particular number. Each protected host 114 can be a device such as a server; laptop device; network element (such as routers, switches, and firewalls); embedded computer device that is embedded in other devices, such as appliances, tools, vehicles, or consumer electronics; or mobile devices, such as laptops, smartphones, cell phones, and tablets.

Protected network 112 supports communication between protected hosts 114. Protected network 112 can include one or more networks, such as an intranet, a local area network (LAN), and/or a wide area network (WAN). In examples, protected network 112 can be an enterprise network, such as a school network, business network, and government network, to list a few examples, that can connect to the Internet. The external network 116 can include one or more WANs, e.g., the Internet, which may be used to access protected network 112.

Figure 2:
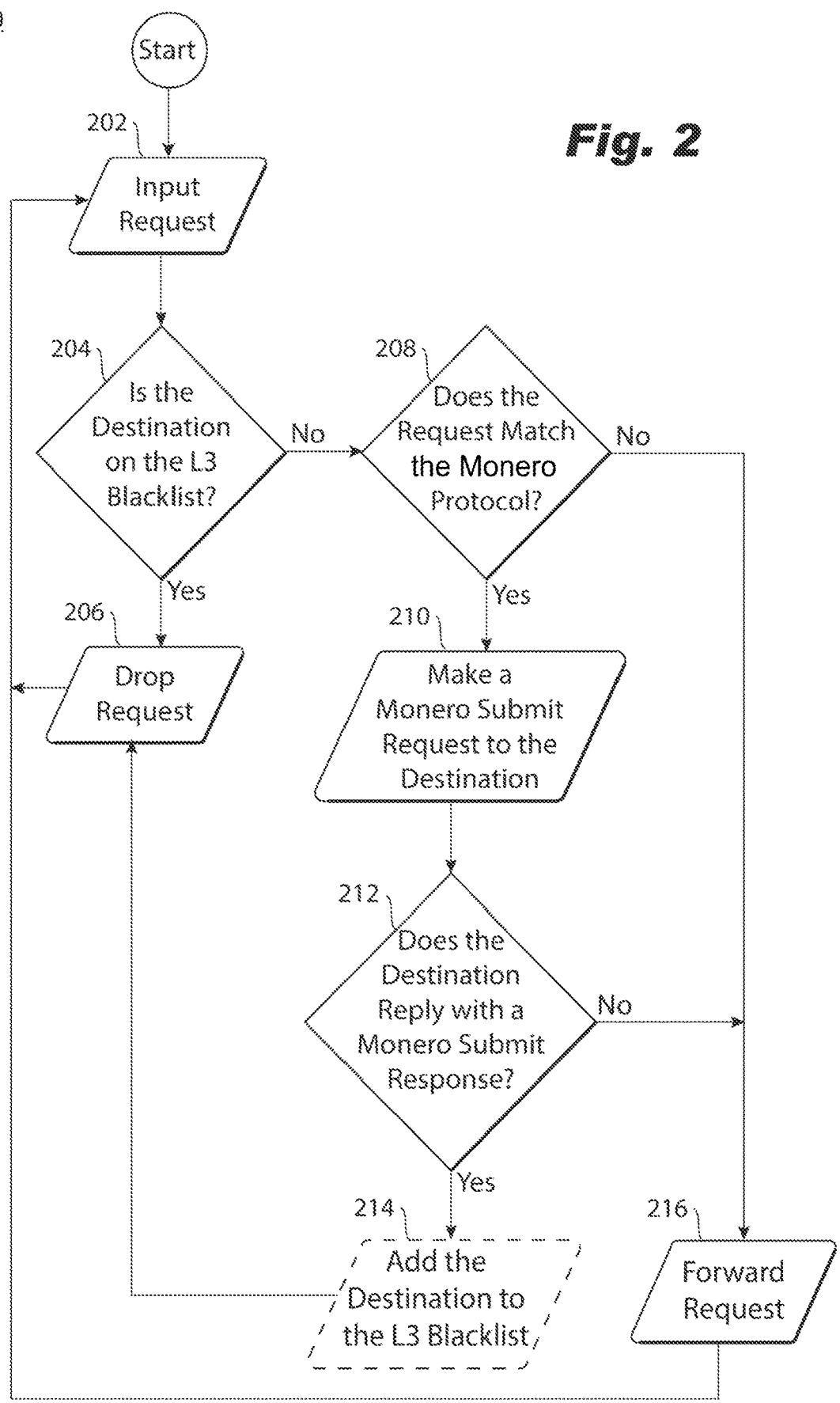
FIG. 2 illustrates a flowchart showing an example method performed by the network monitor of FIG. 1.

With reference now to FIG. 2, shown is a flowchart demonstrating implementation of the various exemplary embodiments. It is noted that the order of operations shown in FIG. 2 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the transfer of information is not meant to be limiting. For example, the term "receive" as used herein refers to obtaining, getting, accessing, retrieving, reading, or getting a transmission. Use of any of these terms is not meant to exclude the other terms. Data that is transferred to or from a module can be transferred by a transmission to or from the module, or can include the data in a location that can be accessed by the module or is provided in a manner to be accessible to another module.

FIG. 2 shows a flowchart 200 of operations performed by a network monitor, such as network monitor 102 shown in FIG. 1. At block 202, a first request is received from a protected host of a protected network, such as protected host 114 of protected network 112 shown in FIG. 1.

In one or more embodiments, at block 204, a determination is made whether a destination of the first request is L3 blacklisted. Block 204 can be optional in one or more embodiments. The destination is represented in the request, such as by a destination IP address and/or IP port. This determination can include consulting an L3 blacklist and L3 information included in the first request. The L3 blacklist is stored or is accessible to the network monitor.

If it is determined at block 204 that the first request is L3 blacklisted (YES), the method continues at block 206. At block 206, the first request is dropped, meaning it is not delivered to its intended destination.

If it is determined at block 204 that the first request is not L3 blacklisted (NO), the method continues at block 208. At block 208, it is determined whether the first request is a cryptocurrency request for a cryptocurrency of one or more cryptocurrencies. A library of protocols for requests of the one or more cryptocurrencies can be consulted to determine whether the first request is consistent with one of the protocols. The library of protocols for requests can be stored, for example, by a library that is stored by or accessible to the network monitor, such as library 140, shown in FIG. 1. The determination whether the first request uses one of the protocols can include a determination whether the first request uses a protocol specified for requests that belong to communication associated with the cryptocurrency.

The protocol is defined by rules set by a group that governs the cryptocurrency. The governing group can be, for example, an open source group that publishes protocols to be used for requests and responses involved in communication associated with the cryptocurrency. In one or more embodiments, the attack monitor can monitor for a particular cryptocurrency. The library of protocols can include protocols for requests and responses for the particular cryptocurrency. In one or more embodiments, the attack monitor can monitor for multiple cryptocurrencies. The library of protocols can include protocols for requests and responses for the multiple cryptocurrencies. The first request can be compared to the protocols for requests until it is determined that one (or none) of the protocols is used by the first request. An example is described below with reference to Tables 1 and 2, of sample requests and a protocol used for a particular cryptocurrency.

In response to a determination at that the first request is a cryptocurrency request for the cryptocurrency, a second request is submitted to a destination of the first request, wherein the second request is formatted as a cryptocurrency request for the cryptocurrency. In other words, if it is determined at block 208 that the first request is a cryptocurrency request for a cryptocurrency (YES), the method continues at block 210. At block 210, a second request is submitted to the destination identified in the first request. The second request uses the protocol for the cryptocurrency. Since the second request is submitted by the network monitor, any response to the second request will be received by the network monitor.

At block 212, a determination is made whether a response to the second request is a cryptocurrency response for the cryptocurrency, which includes determining whether the response to the second request uses the protocol specified for responses of communications associated with the cryptocurrency.

If it is determined at block 212 that the response to the second request is a cryptocurrency response for the cryptocurrency (YES), the method continues at block 214. At block 214, an intervention action is caused. The intervention action can include dropping the first request. In one or more embodiments, the intervention action can further include adding the destination indicated by the first request to the L3 blacklist, which will allow for future requests from the same destination to be dropped. Block 214 is shown in dotted lines to indicate that it can be optional in one or more embodiments.

If it is determined at block 208 that the first request is not a cryptocurrency request for the cryptocurrency (NO), or if it is determined at block 212 that the response to the second request is not a cryptocurrency response for the cryptocurrency (NO), the method continues at block 216. At block 216, the first request is forwarded for normal processing, e.g., to the destination indicated by the first request.

Table 1 shown below shows several examples of different types of Monero requests, including a login request, a submit request and a keepalive request. Table 2 shows keys for each request and parameters keys. As an example, a determination at block 208 whether the first request is a Monero key would include applying rules to determine whether the first request includes all of the keys and the parameter keys of one of the types of Monero requests. If the rules are satisfied, then the determination at block 208 would be that the first request uses Monero protocol for requests (YES), and the method would continue at block 210. If the rules are not satisfied, then the determination at block 208 would be that the first request does not use Monero protocol for requests (NO), and the method would continue at block 216 to forward the first request for normal processing.

TABLE 1

Monero Request Examples

| Method | Example |
|---|---|
| login | {"id":1,<br>"jsonrpc":"2.0",<br>"method":"login",<br>"params": {"login":"...",<br>"pass":"x",<br>   "agent":"XMRig/3.1.3 (Linux x86_64) libuv/1.31.0 gcc/5.4.0",<br>   "algo":["cn/1","cn/2","cn/r","cn/wow","cn/fast","cn/half","cn/xao","cn/rto","cn/rwz",<br>"cn/zls","cn/double","cn/gpu","cn-lite/1",<br>   "cn-heavy/o","cn-heavy/tube","cn-heavy/xhv","cn-pico","rx/test","rx/wow","rx/loki","argon2/chukwa","argon2/wrkz"]}} |
| submit | {"id":2,<br>"jsonrpc":"2.0",<br>"method":"submit",<br>"params":{"id":"b7fee00c-2abl-4099-8780-ed2a5012fdc5",<br>"job_id":"/g4IAqTXfoeAm8ztjGLiEnBmTIPX",<br>"nonce":"5d4601c9",<br>"result":"e47fdec6a43f397138a118e64330367ba5b424881b68693031a3d82cde5a0000",<br>"algo":"cn/r"}} |
| keepalive | {"id":11,<br>"jsonrpc":"2.0",<br>"method":"keepalived",<br>"params":{"id":"b7fee00c-2abl-4099-8780-ed2a5012fdc5"}} |

TABLE 2

Monero Request Keys

| Method | Keys | Params Keys |
|---|---|---|
| login | id, jsonrpc, method, params | login, pass, agent, algo |
| submit | id, jsonrpc, method, params | id, job_id, nonce, result, algo |
| keepalive | id, jsonrpc, method, params | id |

A determination at block 208 whether the first request uses the protocol for the Monero cryptocurrency of one or more cryptocurrencies can include inspecting a payload of the first request, determining whether the payload includes a JavaScript Object Notation (JSON) formatted string, and whether the JSON formatted string includes a superset of a request key set known to be used by Monero, wherein example request key sets are illustrated in Table 2 as a combination of the Keys and Params Keys belonging to the respective entries. In one or more embodiments, an existing network monitor can be retrofitted to perform the method described. The known pools for one or more respective cryptocurrencies can be updated with custom proxies that have not been seen before, allowing a network monitor to detect outgoing and/or incoming communication associated with malicious actors that have commandeered protected hosts in a protected network and cause an intervention action to be implemented.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network monitor 102 may be implemented or executed by one or more computer systems. For example, network monitor 102 can be implemented using a computer system such as example computer system 300 illustrated in FIG. 3. In various embodiments, computer system 300 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 300 is only one example of a suitable system and is not intended to suggest any limitation as to the scope of use or functionality of embodiments of the disclosure described herein. Regardless, computer system 300 is capable of being implemented and/or performing any of the functionality set forth hereinabove.

Computer system 300 may be described in the general context of computer system-executable instructions, such as program modules, being executed by a computer system. Generally, program modules may include routines, programs, objects, components, logic, data structures, and so on that perform particular tasks or implement particular abstract data types. Computer system 300 may be practiced in distributed data processing environments where tasks are performed by remote processing devices that are linked through a communications network. In a distributed data processing environment, program modules may be located in both local and remote computer system storage media including memory storage devices.

Figure 3:
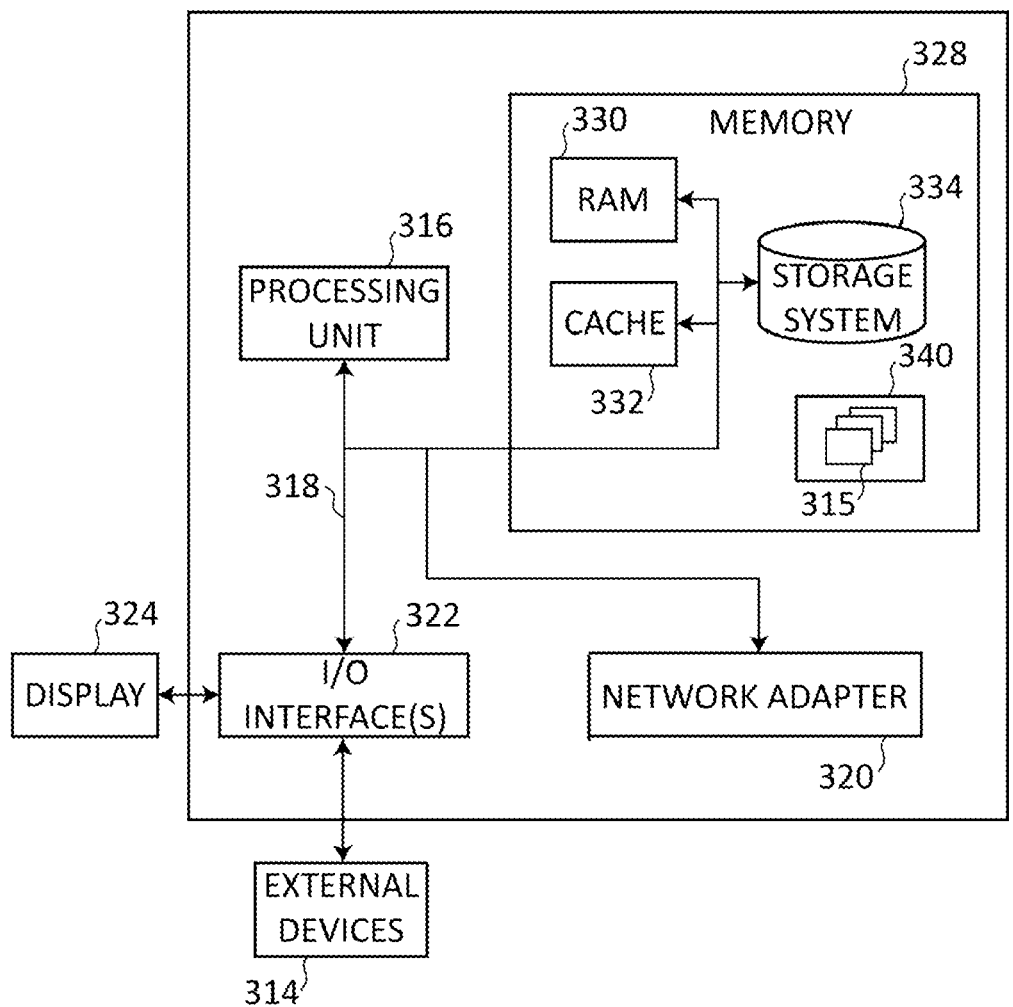
FIG. 3 illustrates an example computing system that could be used to implement a network monitor of a network protection system.

Computer system 300 is shown in FIG. 3 in the form of a general-purpose computing device. The components of computer system 300 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 300 typically includes a variety of computer system readable media. Such media may be any available media that is accessible by computer system 300, and it includes both volatile and non-volatile media, removable and non-removable media.

System memory 328 can include computer system readable media in the form of volatile memory, such as random access memory (RAM) 330 and/or cache memory 332. Computer system 300 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 315, such as computer system 300, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 315 generally carry out the functions and/or methodologies of embodiments of the disclosure as described herein.

Computer system 300 may also communicate with one or more external devices 314 such as a keyboard, a pointing device, a display 324, etc.; one or more devices that enable a user to interact with computer system 300; and/or any devices (e.g., network card, modem, etc.) that enable network monitor 102 to communicate with one or more other computing devices. Such communication can occur via Input/Output (I/O) interfaces 322. Still further, computer system 300 can communicate with one or more networks such as a local area network (LAN), a general wide area network (WAN), and/or a public network (e.g., the Internet) via network adapter 320. As depicted, network adapter 320 communicates with the other components of network management server 104 via bus 318. It should be understood that although not shown, other hardware and/or software components could be used in conjunction with computer system 300. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A computer-implemented method of monitoring network traffic for cryptojacking activity, the method comprising:
receiving a first request from a protected host of a protected network;
determining whether the first request is a cryptocurrency request for a particular cryptocurrency of at least one cryptocurrency based on whether the request uses a protocol specified for requests that belong to communication associated with the particular cryptocurrency;
in response to a determination that the first request is a cryptocurrency request for the particular cryptocurrency, submitting a second request to a destination of the first request, wherein the second request is formatted as a cryptocurrency request for the particular cryptocurrency;
determining whether a reply to the second request from the destination is a cryptocurrency response for the cryptocurrency based on whether the reply uses a protocol specified for responses that belong to communication associated with the particular cryptocurrency; and
causing an intervention action in response to a determination that the reply to the second request from the destination is a cryptocurrency response for the particular cryptocurrency.

2. The computer-implemented method of claim 1, further comprising, in response to a determination that the first request is not a cryptocurrency request for the particular cryptocurrency, forwarding the first request to its intended destination.

3. The computer-implemented method of claim 1, further comprising, in response to a determination that the reply is not a cryptocurrency response for the particular cryptocurrency, forwarding the first request to its intended destination.

4. The computer-implemented method of claim 1, wherein the intervention action includes at least one of adding the destination to a blacklist and dropping the first request.

5. The computer-implemented method of claim 1, further comprising:
determining whether the destination is blacklisted; and
causing the intervention action in response to a determination that the destination is blacklisted.

6. The computer-implemented method of claim 5, wherein the intervention action includes dropping the first request.

7. A computer system for monitoring network traffic for cryptojacking activity, comprising:
a memory configured to store instructions;
at least one processor disposed in communication with said memory, wherein instructions, upon execution by the at least one processor, cause the at least one processor to:
receive a first request from a protected host of a protected network;
determine whether the first request is a cryptocurrency request for a particular cryptocurrency of at least one cryptocurrency based on whether the request uses a protocol specified for requests that belong to communication associated with the particular cryptocurrency;
in response to a determination that the first request is a cryptocurrency request for the particular cryptocurrency, submit a second request to a destination of the first request, wherein the second request is formatted as a cryptocurrency request for the particular cryptocurrency;
determine whether a reply to the second request from the destination is a cryptocurrency response for the cryptocurrency based on whether the reply uses a protocol specified for responses that belong to communication associated with the particular cryptocurrency; and
cause an intervention action in response to a determination that the reply to the second request from the destination is a cryptocurrency response for the particular cryptocurrency.

8. The computer system of claim 7, wherein the instructions, upon execution by the at least one processor, further cause the at least one processor to, in response to a determination that the first request is not a cryptocurrency request for the particular cryptocurrency, forward the first request for to its intended destination.

9. The computer system of claim 7, wherein the instructions, upon execution by the at least one processor, further cause the at least one processor to, in response to a determination that the reply is not a cryptocurrency response for the particular cryptocurrency, forward the first request to its intended destination.

10. The computer system of claim 7, wherein the intervention action includes at least one of adding the destination to a blacklist and dropping the first request.

11. The computer system of claim 7, wherein the instructions, upon execution by the at least one processor, further cause the at least one processor to:
determine whether the destination is blacklisted; and
cause the intervention action in response to a determination that the destination is blacklisted.

12. The computer system of claim 11, wherein the intervention action includes dropping the first request.

13. A non-transitory computer readable storage medium and one or more computer programs embedded therein, wherein the computer programs comprise instructions, which, when executed by a computer system, cause the computer system to:
receive a first request from a protected host of a protected network;
determine whether the first request is a cryptocurrency request for a particular cryptocurrency of at least one cryptocurrency based on whether the request uses a protocol specified for requests that belong to communication associated with the particular cryptocurrency;
in response to a determination that the first request is a cryptocurrency request for the particular cryptocurrency, submit a second request to a destination of the first request, wherein the second request is formatted as a cryptocurrency request for the particular cryptocurrency;
determine whether a reply to the second request from the destination is a cryptocurrency response for the particular cryptocurrency based on whether the reply uses a protocol specified for responses that belong to communication associated with the particular cryptocurrency; and cause an intervention action in response to a determination that the reply to the second request from the destination is a cryptocurrency response for the particular cryptocurrency.

14. The non-transitory computer readable storage medium of claim 13, wherein the computer programs, upon execution by the computer system, further cause the computer system to, in response to a determination that the first request is not a cryptocurrency request for the particular cryptocurrency, forward the first request to its intended destination.

15. The non-transitory computer readable storage medium of claim 13, wherein the computer programs, upon execution by the computer system, further cause the computer system to, in response to a determination that the reply is not a cryptocurrency response for the particular cryptocurrency, forward the first request to its intended destination.

16. The non-transitory computer readable storage medium of claim 13, wherein the intervention action includes at least one of adding the destination to a blacklist and dropping the first request.

17. The non-transitory computer readable storage medium of claim 13, wherein the computer programs, upon execution by the computer system, further cause the computer system to:
   determine whether the destination is blacklisted; and
   cause the intervention action in response to a determination that the destination is blacklisted.

18. The non-transitory computer readable storage medium of claim 17, wherein the intervention action includes dropping the first request.

* * * * *